Jan. 17, 1950 — R. W. CANFIELD ET AL — 2,494,689
METHOD AND APPARATUS FOR PRODUCING TWISTED THERMOPLASTIC RESIN STRIPS
Filed Feb. 25, 1947

Inventors
Robert W. Canfield
Robert B. Woodward
by Parham + Bates
Attorneys

Jan. 17, 1950 R. W. CANFIELD ET AL 2,494,689
METHOD AND APPARATUS FOR PRODUCING TWISTED
THERMOPLASTIC RESIN STRIPS
Filed Feb. 25, 1947 2 Sheets-Sheet 2

Inventors
Robert W. Canfield
Robert B. Woodward
by Parham & Bates
Attorneys

Patented Jan. 17, 1950

2,494,689

UNITED STATES PATENT OFFICE 2,494,689

METHOD AND APPARATUS FOR PRODUCING TWISTED THERMOPLASTIC RESIN STRIPS

Robert W. Canfield, West Hartford, and Robert B. Woodward, South Coventry, Conn., assignors to Plax Corporation, Hartford, Conn., a corporation of Delaware Application February 25, 1947, Serial No. 730,836

14 Claims. (Cl. 18—12)

The present invention relates to improvements in the art of forming thermoplastic resin articles, and more particularly to novel method and apparatus for manufacturing articles, as, for example, rod having a permanent twist.

An object of the invention is to provide improved method and apparatus of the type indicated by means of which rod of any one of a variety of cross-sections can be manufactured with a twist of regular and uniform predetermined pitch.

A further object is the provision of novel method and apparatus by means of which the twist or pitch can be accurately predetermined within a wide range.

Another object is to provide apparatus capable of continuously establishing a predetermined twist in a rod as it issues in a formable untwisted condition from an extruder, and of thereafter rigidifying the rod while maintaining that twist.

Rod made in accordance with the present invention has many advantages, including strength and decorative appeal. Twisted, multisided rod does not present a horizontal surface in any position, and water will not collect on it. This feature makes lengths of it particularly suitable as separators with which to hold apart exposed wires and electrical leads.

Other objects and advantages of the invention will hereinafter be pointed out or will become apparent in the following description of the particular embodiments of the invention illustrated in the accompanying drawings, in which.

Figure 1:
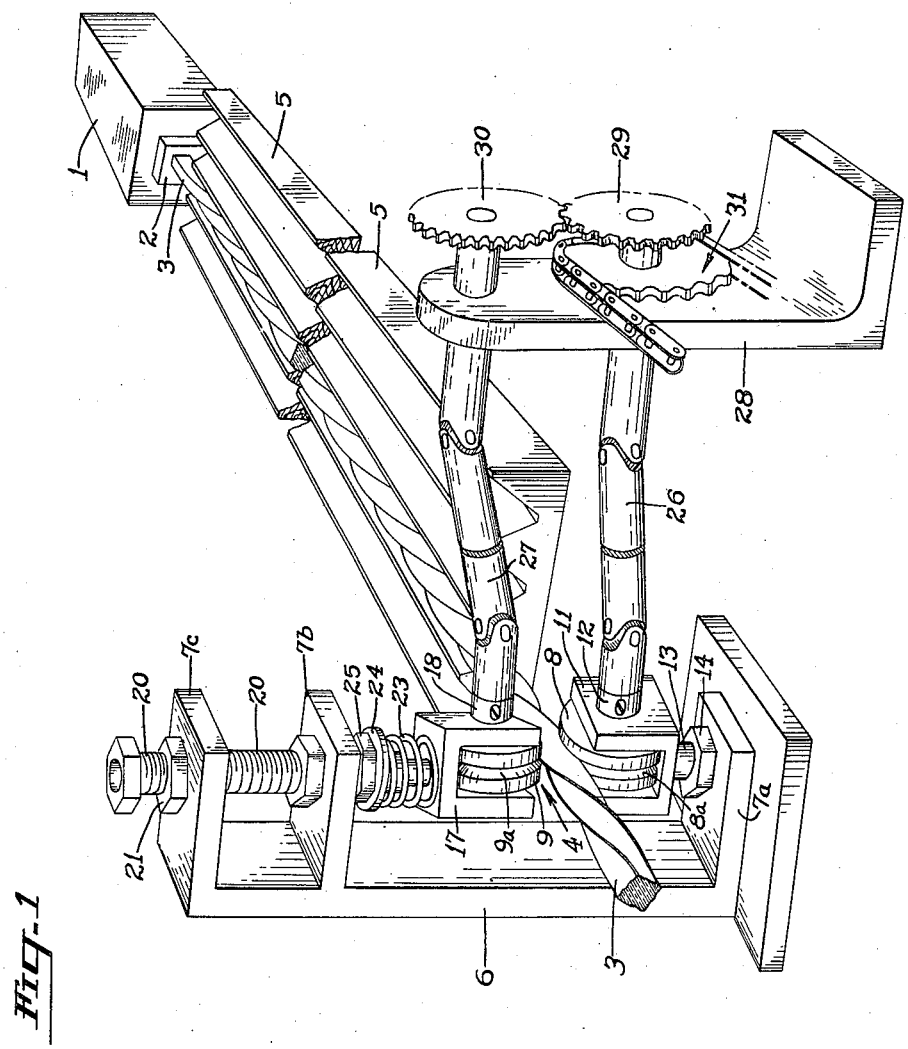
Fig. 1 is a perspective view of one embodiment of rod extruding apparatus and cooperating pulling-twisting rolls for producing, in accordance with the present invention, twisted rod of square cross-section.

The embodiment of the invention illustrated in Fig. 1 generally includes an extruder 1 and die 2 for producing plastic rod 3. A twisting-pulling apparatus, indicated generally by the numeral 4, is located at a distance from the die 2 and is adapted to maintain a required number of turns or twists in a portion of the extruded rod 3 between the extruding die 2 and the mechanism 4 and, at the same time, to pull or feed the rod through the mechanism 4 at the same speed as that at which it leaves the die 2.

Any one of a variety of commercial model extruders are satisfactory for producing the thermoplastic rod 3. Likewise, the die may be of conventional design. The illustrated embodiment of the invention employs an extruder 1 and die 2 which is adapted to produce a continuous rod 3 of uniform square cross-section. A wooden guide member 5 having one or more grooves of V cross-section is preferably employed to channel the rod 3 from the die 2 to the pulling-twisting mechanism 4.

Referring more particularly to the pulling-twisting mechanism 4, it includes a stationary supporting structure or frame 6 in which a pair of steel pulling-twisting rolls 8 and 9 are operably mounted. The rolls are respectively provided with peripheral grooves 8a and 9a which are adapted to receive and frictionally grip diametrically opposite edges of the rod 3. The included angle of the grooves 8a and 9a in the rolls may vary. However, it has been found preferable to make the included angle greater than the angle of the rod cross-section engaged thereby. Thus, when square rod having 90° corners is being twisted, the included angle of the grooves should be greater than 90°. The 120° angles illustrated in Figs. 1 and 2 have been found suitable for rod varying from $\tfrac{1}{16}$ to 1 inch in thickness.

The rolls are mounted so that they can be skewed relative to each other and to the rod passing therebetween. The lower roll 8 is keyed or otherwise secured on a stud 10 which is rotatably mounted in a horizontal position in the arms of a U-shaped bearing block or bracket 11. Collars 12 are adjustably secured on the stud 10 outwardly of the bracket arms so as to limit the end play of the stud 10. A double ended bolt 13 and a jam nut 14 secure the under or closed side of the block 11 in a horizontal position relative to a horizontally disposed base plate portion 7a of the frame 6 and provides for adjustment of the roll at a desired skew angle to the rod 3 and the upper roll 9.

The upper roll 9 likewise is keyed or otherwise secured on a second stud 15 which is rotatably journaled in bronze bushings 16 located in a U-shaped upper bearing block 17. Collars 18 are secured to the stud 15 outwardly of the bracket arms so as to limit the end play of the stud 15. As illustrated in the drawings, a guide rod 19 is secured perpendicularly to the upper or closed side of the bearing block 17. The rod 19 extends vertically upward through a bearing sleeve 20 which is threaded into the upper horizontal arm positions 7b and 7c of the frame 6. Jam nuts 21 are provided on the threaded sleeve 20 so as to secure the sleeve at a desired height relative to the frame arms 7b and 7c with the roll at 9 at a desired skew angle to both the rod 3 and the lower roll 8.

The guide rod 19 and guide sleeve 20 are resectively provided with the cooperating parts of a pin-and-slot connection 22 which permits relative reciprocal movement while preventing rotational movement between the guide rod and the sleeve. The proper skew angle of the roll 9 thus is maintained during a rod twisting operation. The guide rod 19, with its upper roller bracket 17, is normally urged by a coil spring 23 to its lowermost position, as determined by engagement of the upper roller 9 with the lower roller 8 (Fig. 2) or engagement of the upper roller 9 with the plastic rod 3 (Fig. 1). The spring 23 is held under compression between the bearing block 17 and a washer 24, the position of which is determined by a nut 25 located on the lower end of the sleeve 20. The amount of compressive force exerted by the spring through the block 17 and roll 9 onto the rod 3 may be varied by adjustment of the nut 25 on the sleeve 20.

In the embodiment of the invention illustrated in the drawings, the pulling-twisting rolls 8 and 9 are driven through universal drive shafts 26 and 27 which are respectively coupled to the lower and upper studs 10 and 15. The outer ends of the universal drives 26 and 27 are rotatably journaled in a stationary bearing member 28 and interconnected through like spur gears 29 and 30 so as to insure simultaneous rotation of the two drives. A variable speed motor (not shown) is preferably used to rotate one or the other of the thus interconnected universal drives, the variable speed feature being desirable in order to synchronize the peripheral speed of the rolls 8 and 9 with that at which the rod engaged thereby emerges from the die. A connection may be effected between the variable speed motor (not shown) and the universal drives 26 and 27 as by the chain and sprocket drive 31.

The operation of the embodiment of the heretofore described invention is as follows: The thermoplastic square rod 3, as it emerges from the die through the extruder 1 in a plastic or deformable condition, is given a desired number of turns by hand and threaded through the pulling-twisting rolls 8 and 9. The peripheral speed of the rolls is approximately synchronized with rate of extrusion of the rod, any discrepancy favoring a slightly faster roll speed, and the skew angle of the rolls relative to the line of travel of the rod adjusted to conform to the angles of the corners of the rod engaged thereby. It has been found that the twist thus established in the rod is uniformly distributed throughout the portion between the pulling-twisting rolls 8 and 9 and the die 2. Assuming that the pulling-twisting mechanism is sufficiently remote from the die, as, for example, in the neighborhood of 20 feet in the case of ½ inch square polystyrene rod, extruded at a temperature of approximately 400° F. and at a rate of approximately 5½ feet per minute, the rod is sufficiently cooled before it reaches the rolls 8 and 9 so that it permanently assumes the twist established in the hotter deformable portion of the rod adjacent the die and no deformation takes place when the rod is pulled therebetween.

If a greater twist pitch (i. e., larger number of turns per unit length) is desired, the upper bearing block 17 is raised against the action of the spring 23 and the necessary number of additional turns placed in the rod between the mechanism 4 and the die 2. It will be understood that, if a considerable number of additional turns are thus placed in the rod, a further adjustment of the skew angle of the rolls relative to the rod should be made. It is advisable to approach the desired pitch in three or four steps. The plastic should be completely set before reaching the twisting rolls and the angle of skew of the rolls should be adjusted to the pitch angle of the rod.

Figure 2:
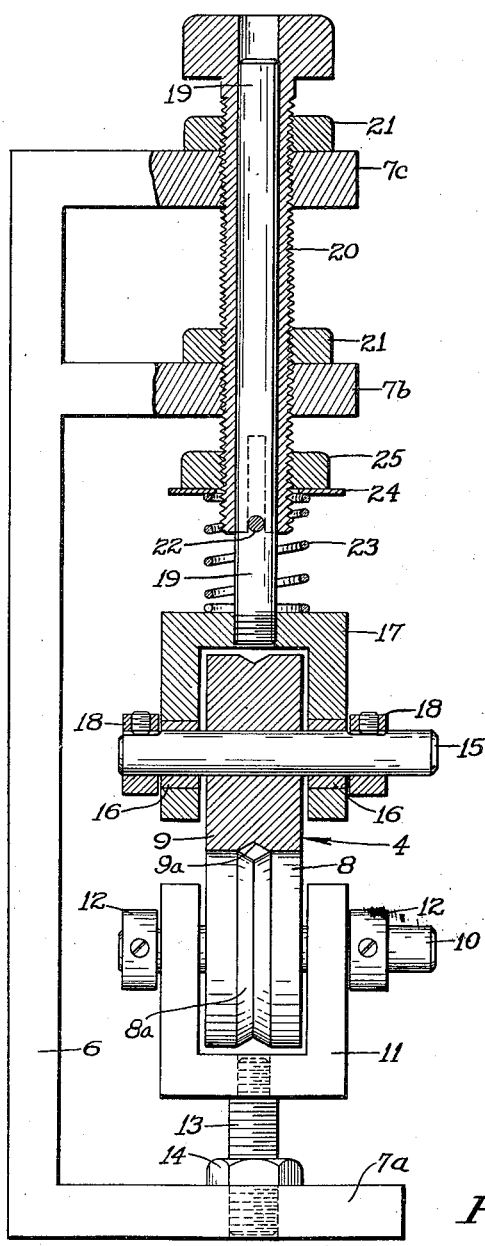
Fig. 2 is a front elevation partially sectioned of the pulling-twisting mechanism shown in Fig. 1.
Figure 3:
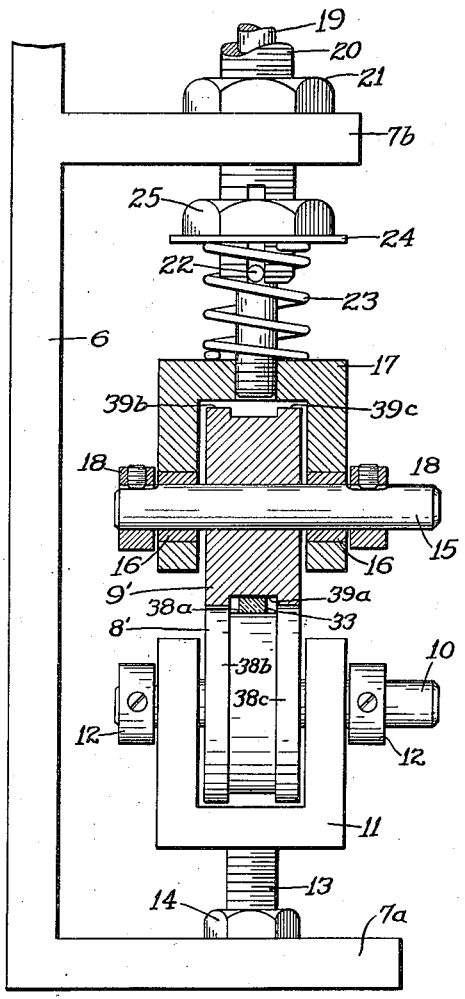
Fig. 3 is a front elevation partially sectioned showing a modification of the pulling-twisting rolls of Fig. 1 suitable for establishing a twist in rod having a greater cross-sectional width than thickness.

Fig. 3 illustrates a second embodiment of the present invention for establishing a twist in rectangular rods having a greater width than thickness. The only difference in this embodiment over that illustrated in Figs. 1 and 2 is in the pulling-twisting rolls 8' and 9' which are circumferentially recessed so as to present opposing cylindrical surfaces 38a and 39a. The roll surfaces 38a and 39a are adapted to frictionally engage opposite parallel surfaces of a thermoplastic rod 33. Shoulders 38b and 38c, and 39b and 39c prevent the rod from riding off the rolls.

While the embodiments of the invention heretofore described contemplate extruding and twisting a plastic rod in a continuous operation, it will be understood that preformed or preshaped rod likewise may be twisted. If preshaped rod is to be twisted, it first is reheated to plasticity and then fed to the pulling-twisting mechanism from a restraining member such as the die 2 or a pair of rolls, which maintain the desired number of turns in the portion of the rod between the restraining member and the pulling-twisting rolls.

Having thus described our invention, we claim:

1. The method of producing a rod of thermoplastic material uniformly twisted to a predetermined pitch which comprises continuously feeding the rod from a first point through a second spaced point, placing a predetermined number of turns in the portion of said rod between said points, preventing rotation of the portion of the rod at one of said points while rotating the portion of the rod between said two points a number of turns corresponding to the number of turns in the portion of the rod between said points, said rotation of the rod occurring at a uniform speed in the time consumed by the travel of a point on said rod between said first and second points.

2. The method of producing a rod of thermoplastic material uniformly twisted to a predetermined pitch which comprises continuously feeding the rod from a first point through a second spaced point, rendering the rod formably plastic at said first point and substantially non-deformably rigid at said second point, placing a predetermined number of turns in the portion of said rod between said points, preventing rotation of the portion of the rod at one of said points and rotating the portion of the rod between said first and second points a number of turns corresponding to the number of turns in the portion of the rod between said first and second points, said rotation of the rod occurring at uniform speed in the time consumed by the travel of a point on said rod between the first and the second points.

3. The process described in claim 2 and wherein the substantially rigid portion of the rod is propelled through said second point at approximately the same speed as that at which the formably plastic portion leaves said first point.

4. The process described in claim 2 and wherein the rod passes said second point at approximately the same speed as that at which it leaves said first point.

5. The process described in claim 2 and wherein tension is maintained in the portion of the rod between said first and second points.

6. Apparatus for producing rod of thermoplastic material uniformly twisted to a predetermined pitch which comprises a first restraining means constructed and arranged to feed a rod of thermoplastic material continuously in a non-twisted and deformable condition, spaced from said first restraining means, a second restraining means through which the rod continuously passes in a uniformly twisted and substantially non-deformable rigid condition for maintaining a predetermined number of turns in the portion of the rod between said two restraining means.

7. Apparatus for producing a rod of thermoplastic material uniformly twisted to a predetermined pitch which comprises a die for extruding a rod of thermoplastic material in a non-twisted and plastically deformable condition, a pair of pulling rolls spaced from said die for continuously pulling said rod in a uniformly twisted and substantially non-deformable rigid condition and for maintaining a predetermined number of turns in the portion of the rod between said rolls and said die.

8. Apparatus as described in claim 7 and wherein the rolls are disposed askew to each other and to the line of travel of the rod.

9. Apparatus as described in claim 8 and including means for independently driving said rolls at the same peripheral speed.

10. Apparatus for producing a rod of thermoplastic material uniformly twisted to a predetermined pitch which comprises a means including a die for continuously extruding said material in a deformable condition and in the form of a rod having at least one straight edge, a zone through which said rod is continuously guided and in which the rod including said edge is twisted to a uniform pitch and rendered substantially non-deformably rigid as so twisted, a pair of rolls spaced from said die by said rigidifying zone, a peripheral groove in one of said rolls, and means for adjusting said grooved roll to continually receive an edge of said twisted rod.

11. Apparatus for producing a rod of thermoplastic material uniformly twisted to a predetermined pitch which comprises a means including a die for continuously extruding said material in a deformable condition and in the form of a rod having diagonally disposed edges, a zone through which said rod is continuously guided and in which the rod including the edges are twisted to a uniform pitch and rendered substantially non-deformably rigid as so twisted, a pair of pulling rolls having peripheral grooves frictionally engageable with said twisted edges, and means for driving one of said rolls.

12. Apparatus for producing a rod of thermoplastic material uniformly twisted to a predetermined pitch which comprises a means including a die for continuously extruding said material in a deformable condition and in the form of a rod having diagonally disposed edges, a zone through which said rod is continuously guided and in which the rod including the edges are twisted to a uniform pitch and rendered substantially non-deformably rigid as so twisted, a pair of pulling rolls having peripheral grooves frictionally engageable with said twisted edges, and means for positively driving both of said rolls at the same peripheral groove speed.

13. The apparatus described in claim 11 and means for resiliently pressing the rolls into engagement with said rod.

14. The method of producing a twisted rod of plastic material which comprises continuously feeding the rod from a first point through a second point spaced from the first point, placing a predetermined number of turns in the portion of the rod between said points, and preventing rotation of the rod at said points while rotating the rod between said points.

ROBERT W. CANFIELD.
ROBERT B. WOODWARD.

REFERENCES CITED

The following references are of record in the file of this patent:

UNITED STATES PATENTS

| Number | Name | Date |
|---|---|---|
| 536,804 | Harsha | Apr. 2, 1895 |
| 1,306,283 | Shaw | June 10, 1919 |
| 1,637,207 | Whitehouse | July 26, 1927 |
| 1,876,444 | Babb | Sept. 6, 1932 |
| 2,171,095 | Orsini | Aug. 29, 1939 |
| 2,369,858 | Ryan | Feb. 20, 1945 |